United States Patent [19]
von Gersdorff

[11] Patent Number: 4,758,958
[45] Date of Patent: Jul. 19, 1988

[54] METHOD AND APPARATUS FOR TRIMMING AND STABILIZING AN AIRCRAFT

[75] Inventor: Michael von Gersdorff, Dietramszell, Fed. Rep. of Germany

[73] Assignee: Messerschmitt-Boelkow-Blohm Gesellschaft mit beschraenkter Haftung, Munich, Fed. Rep. of Germany

[21] Appl. No.: 831,644

[22] Filed: Feb. 20, 1986

Related U.S. Application Data

[63] Continuation-in-part of Ser. No. 770,358, Aug. 27, 1985, abandoned, which is a continuation of Ser. No. 453,478, Dec. 27, 1982, abandoned.

[30] Foreign Application Priority Data

Jan. 14, 1982 [DE] Fed. Rep. of Germany ....... 3200839

[51] Int. Cl.[4] .............................................. B64C 13/18
[52] U.S. Cl. ................... 364/434; 244/17.13; 244/178
[58] Field of Search ............... 244/17.13, 76 R, 76 A, 244/177–181, 184, 188, 191, 195, 194, 221, 220, 223, 197, 198; 318/584; 364/424, 434, 432, 433

[56] References Cited

U.S. PATENT DOCUMENTS

| | | | |
|---|---|---|---|
| 3,345,018 | 10/1967 | Chanak et al. | 244/194 |
| 4,092,716 | 5/1978 | Berg et al. | 364/424 |
| 4,159,444 | 6/1979 | Barlett et al. | 244/194 |
| 4,198,017 | 4/1980 | Murray | 244/17.13 |
| 4,281,811 | 8/1981 | Nixon | 340/945 |
| 4,370,706 | 1/1983 | Doniger et al. | 244/194 X |
| 4,481,586 | 6/1984 | Skutecki | 364/434 |
| 4,500,967 | 2/1985 | Murphy et al. | 364/434 |
| 4,607,201 | 8/1986 | Koenig | 244/181 X |
| 4,642,774 | 2/1987 | Centala et al. | 364/434 |

Primary Examiner—Parshotam S. Lall
Assistant Examiner—Thomas G. Black
Attorney, Agent, or Firm—W. G. Fasse; D. H. Kane, Jr.

[57] ABSTRACT

An aircraft, such as a helicopter, is trimmed into a desired position by producing a trimming control signal during the maneuver for the desired positive and adjusting control forces in response to the trimming control signal. The trimming control signal ($\delta_T$) is produced by comparing a rated or reference signal (R) representing the desired displacement from the force free position of the stick, with a measured signal ($\theta$) representing the rotational speed of an aircraft about a given axis. In addition to the trimming operation a stabilization of the position of the aircraft is performed at the moment when the pilot does not touch the control stick. The measured signals thus include information regarding the deviation of the aircraft from the desired position. Thus, a trimming motor automatically maintains the aircraft into the desired attitude.

5 Claims, 1 Drawing Sheet

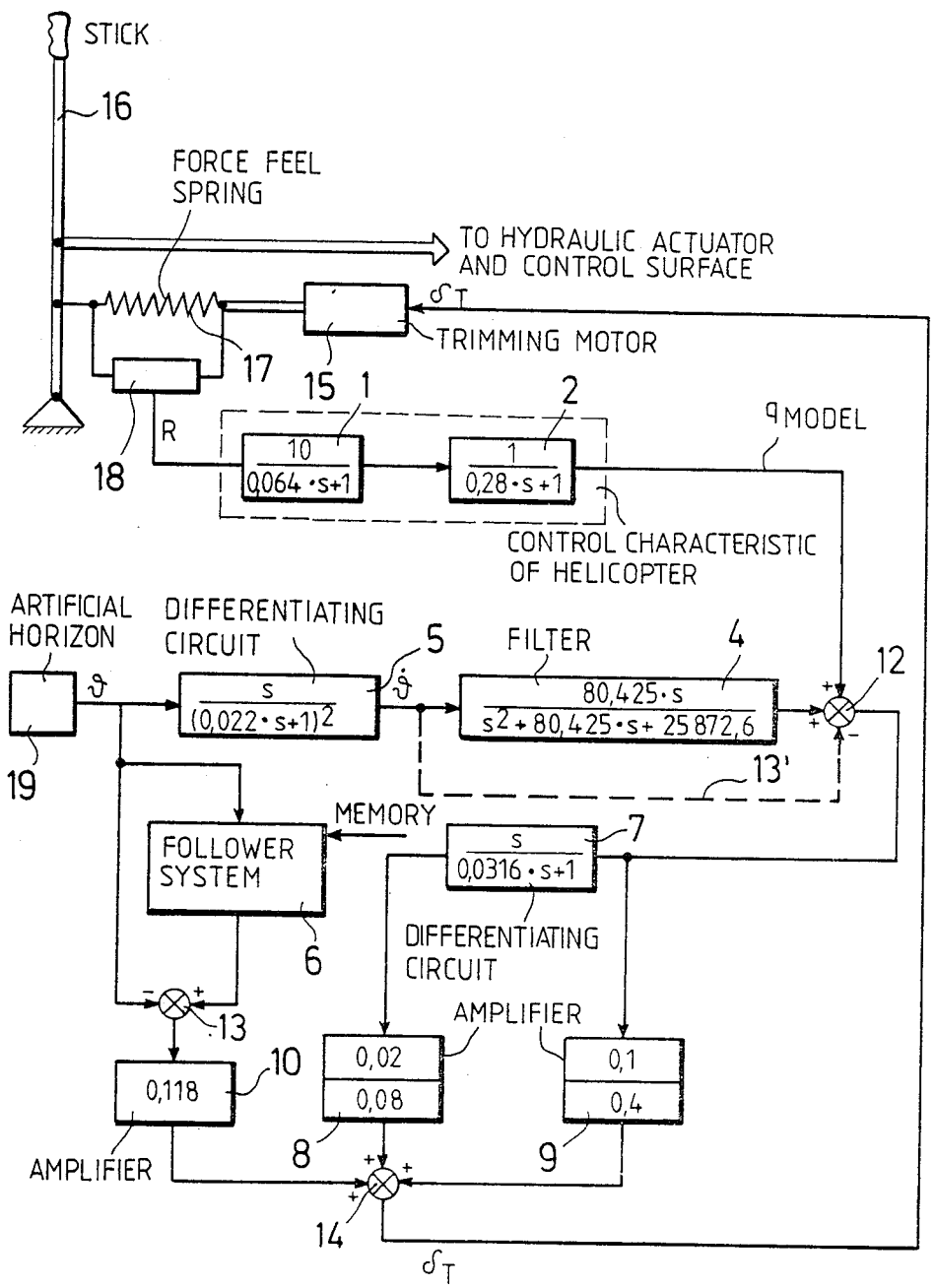

4,758,958

METHOD AND APPARATUS FOR TRIMMING AND STABILIZING AN AIRCRAFT

CROSS-REFERENCE TO RELATED APPLICATION

The present application is a continuation-in-part applicaiton of U.S. Ser. No.: 770,358 now abandoned; filed on Aug. 27, 1985 which is a continuation of U.S. Ser. No. 453,478; filed on Dec. 27, 1982, now abandoned.

BACKGROUND OF THE INVENTION

The invention relates to a method and apparatus for trimming and stabilizing of an aircraft such as a helicopter. The control input signals for trimming and stabilizing an aircraft are proportional to the rotational speeds of the aircraft about its respective axis, such as the pitch axis, the rolling axis, or the yawing axis. The steering mechanism of the aircraft is conventionally equipped with a device for producing for the pilot a simulated sensation of the steering control force, whereby the zero position or neutral position of the steering control force corresponds to a stable attitude (no rate) of the aircraft relative to any of the mentioned axes. Potentiometer means may be used for generating a signal representing the neutral force position of the steering means.

Mechanisms, as described above, are known in the art. Thus, for example, helicopters equipped with a hydraulic power amplification in the steering mechanism also normally comprise a trimming system for the trimming and stabilization about the rolling and pitching axis. Such systems impart to the pilot through biased springs a simulated or artificial sensation or feeling for the steering force. The zero or neutral position of such steering control force is adjustable either by means of a releasable magnetic brake or by an electrical trimming motor, which is controlled through a displacement responsive switch.

German Patent Publicaton (DE-OS) No. 2,634,890 discloses a system for the adjustment of the position of a control surface in an aircraft. Starting at page 12 and the following pages, this reference describes a closed loop trimming control for automatically maintaining the instantaneous position of a control lever. This type of system is said to be compatible with the increase of the control sensation and the reduction of the load on the rotors of a helicopter. However, this type of closed loop trimming control does not take into account the instantaneous position of an aircraft or rather the instantaneous rotational speed of the aircraft about its movement relative to any of the above mentioned axes. Thus, in the device of the prior art the trimming takes place only semi-automatically in response to the operation of a control member, such as a control button. Besides, the known system is not intended to maintain any new instantaneous attitude of an aircraft.

U.S. Pat. No. 4,198,017 (Murray) discloses a control augmentation system for flight vehicles in which angular velocities are controlled in proportion to a controlled input. A stabilization of the corresponding vehicle attitude is also achieved by Murray. By using a "feed forward" signal the controllability factors available to the pilot are augmented. The feedback path augments the vehicle's inherent stability. As shown in FIG. 2 of Murray the control stick is connected to a parallel trim actuator through a spring. However, Murray does not teach the derivation of a q-model signal from the spring connecting the control stick to the parallel trim actuator.

U.S. Pat. No. 4,281,811 (Nixon) discloses a pitch trim system for an aircraft in which the pitch trim system responds to an output of a torque detector providing an input signal to a gain normalization circuit. Providing a simultaneous trimming of the control surface of an aircraft and applying a simulated sensation of the steering control forces to the pilot holding the control stick is not disclosed by Nixon.

U.S. Pat. No. 4,500,967 (Murphy et al) discloses an aircraft short term roll attitude retention system in which a roll attitude retention outer loop actuator, a roll stability inner loop actuator, and a control stick are used for positioning control surfaces of the aircraft to control the roll attitude. A spring is connected between the control stick and a roll retention hydraulic servo. A first position sensor is connected to one end of the spring and a second position sensor is connected to the other end of the spring. A feed back signal is produced including the signal provided by the first sensor for the roll retention hydraulic servo. Additionally, both sensors are connected to a summing circuit which produces a signal for switching an integrator, and to provide an indication that the pilot is controlling the roll attitude of the aircraft against the trim position established by the servo actuator. Such a system also does not provide the simultaneous simulated sensation of the steering control force to the pilot together with the automatic trimming.

OBJECTS OF THE INVENTION

In view of the foregoing it is the aim of the invention to achieve the following objects singly or in combination:

to provide a method and apparatus for the trimming and stabilizing of an aircraft which is capable of a fully automatic trimming operation while simultaneously providing the pilot with an artificial or simulated sensation of the steering control force in response to a shifting of the zero position of the manual pilot controls;

to achieve the above objective with a low expenditure for structural components;

to achieve a fully automatic trimming operation in combination with a self-centering of the system in a minimum of time;

to automatically maintain the desired position of an aircraft, especially the neutral or zero position with a minimum of deviation from such position; and to dimension the trimming motor so that the adjustment of the respective control surface is displacement proportional to a comparing signal, whereby the motor operates as an integrator.

SUMMARY OF THE INVENTION

According to the invention a control signal is produced for the trimming control motor. The control signal is the result of comparing a measured signal representing the rotational speed of an aircraft about the given axis, such as the pitching, rolling or yawing axis, with a rated signal, which is derived from or which represents the relative displacement out of the force free position. Preferably, the trimming motor is so dimensioned that the trimming operation is displacement proportional to the control signal resulting from said comparing.

Contrary to prior art trimming systems the invention achieves a fully automatic trimming operation, while simultaneously substantially reducing the costs for such a system. According to the prior art the trimming operation takes place iteratively or in a sequential manner, first relative to the longitudinal or rolling axis and then relative to the pitching axis, whereby delays are encountered in the self-centering of such prior art systems. The invention avoids such delays.

Another advantage of the invention is seen in that it is not only well suited for use in helicopters, but also in wing-type aircraft. If an aircraft equipped as disclosed herein is to be steered into a new flying attitude, which is to be maintained, for example when passing from a horizontal flight into a descending flight along a 30° descent curve, the control input and the return of the steering column is followed by an immediately effective termination of the control operation, since the new flying attitude is to be maintained. Contrary thereto according to the prior art, the control input and return of the steering column also takes place as described. However, the following trimming and stabilizing operation is yet to be performed according to the prior art, whereby the prior art uses to some extent trimming devices for stabilizing the new flying attitude and whereby in most instances continuous control inputs are necessary for maintaining a new flying attitude. The invention achieves the maintaining of the new flying attitude fully automatically with a negligibly small drift of about 1° per hour in most instances. As mentioned, this is not possible in the prior art, because the maintaining of a new flying attitude must be achieved by the pilot by continuously providing new steering or control inputs.

Yet another advantage of the invention is seen in that the additional expense for structural components as compared to the prior art is negligibly small. Thus, separate trimming motors are not necessary according to the invention, because the invention may use the normal control motors for the intended trimming and stabilizing operation.

According to the invention the force feel spring is connected between the control stick and the trimming motor. A transducer is connected to both ends of the force feel spring to provide a difference signal which is then supplied to a circuit arrangement representing the control characteristic of a helicopter, for example, and this circuit arrangment provides a q-model signal which is then compared with the rotational speed about the respective axis.

Due to this arrangement, according to the invention, it is possible for the trimming motor to directly move the respective control surfaces through the force feel spring because the break out force of the spring is selected to be higher than the input force of the hydraulic actuator. Thus, at any time when the pilot does not apply a force to the input, the attitude of the aircraft is maintained constant by the motion of the trimming motor, whereby a follower is in the mode: memory. When the pilot gives an input at the control stick, the follower is in a sample mode so that the output of the respective summing circuit remains zero. A comparison between the rotational speed and the displacement of the stick representing the force applied to the force feel spring, is then performed and a simulated sensation of the steering control force is maintained by the displacement of the trimming motor. Due to this arrangement only one trimming motor is needed for each axis of orientation to perform a trimming and stabilizing of the aircraft. This is not the case in the references discussed above.

By comparing a q-model signal derived from a difference signal sensed from the or across the force feel spring, with a signal representing the roll rotational speed derived from a horizon, the trim motor is controlled in a way to achieve the above mentioned simultaneous automatic trimming operation during a flight maneuver and the simulated sensation of the steering control force.

BRIEF FIGURE DESCRIPTION

In order that the invention may be clearly understood, it will now be described, by way of example, with reference to the single FIGURE of the accompanying drawing showing a block circuit diagram of the system according to the invention for trimming and stabilizing an aircraft.

DETAILED DESCRIPTION OF PREFERRED EXAMPLE EMBODIMENTS AND OF THE BEST MODE OF THE INVENTION

The single FIGURE shows a circuit diagram for trimming and stabilizing an aircraft relative to its pitching axis. However, the respective operations relative to other axes may be performed in an analogous manner by corresponding circuits.

The steering column 16 manually operated by the pilot adjusts a trimming spring 17 operatively arranged between the steering column 16 and a trimming motor 15 so that the instantaneous position of the trimming spring 17 corresponds to the blade angle position in a helicopter, for example. The trimming spring 17 is operatively connected across a transducer 18 for producing a rated difference signal R representing a relative displacement of said trimming spring 17 out of a centered neutral, desired trimmed position. The so derived rated difference signal R is supplied to signal processing circuits, such as low pass filter circuits 1 and 2, which perform the function inscribed in the respective circuit blocks 1 and 2 for simulating the control characteristics of a helicopter in the frequency range of about 0.2 to 5 Hz, to provide a q-model signal. The so processed q-model signal at the output of the low pass circuit 2 is a signal representing a rated or desired or model condition of an aircraft such as a helicopter. This q-model signal is produced in response to the mentioned zero or neutral force position of the steering column and hence represents a stable, that is, trimmed, attitude of the aircraft.

A further transducer or sensor 19 of conventional construction provides a measured artificial horizon signal $\theta$, for example for the pitch axis, and represents the attitude of an aircraft relative to the given axis, e.g., the pitch axis. To produce this signal the transducer 19 may, for example, be a vertical gyro which measures the instantaneous pitching angle of the aircraft. The measured signal $\theta$ is supplied to a differentiating circuit 5 which calculates the pitching rotational speed of the aircraft. The output signal of the differentiating circuit 5 is supplied through a structural filter 4 to one input of a further summing network 12, which also receives at a further input the q-model signal from the output of the low pass filter circuit 2. The structural filter 4 is used, when the circuit is employed in a helicopter. The filter 4 is not necessary when the system is used for a wing-type aircraft, in which case the filter 4 is simply by-passed by a conductor shown as a dashed line 13'. The structural filter 4 filters out any undesired side effects resulting from vibrations from the helicopter.

The output of the summing circuit 12 is supplied simultaneously to a differentiating circuit 7 and to an amplifier circuit 9. The differentiating circuit 7 compensates for the integration of all control signals taking place or occurring in the trimming motor 15. The amplifier 9 provides a positon proportional amplification.

Further, the measured signal $\theta$ representing the attitude or the pitching angle is supplied simultaneously to a follower system 6 having a memory and to a summing circuit 13. The follower system 6 stores the most recently measured pitching attitude at the time when the steering column 16 was moved into the trimming positon. The purpose of the follower system 6 is to provide a long duration stabilization of the attitude angle. The output signal from the follower system 6 and the measured signal $\theta$ are supplied to a further summing circuit 13, the output of which passes through an amplifier 10. The output signal of the differentiating circuit 7 is supplied through an amplifier 8 providing amplifications proportional to the rotational or pitching speed with which the aircraft changes its attitude. The output of the amplifiers 8 and 9 are supplied to a further summing network 14, which also receives the output signal from the amplifier 10. The output of the summing network 14 provides the trimming control signal $\delta_T$ supplied to the trimming motor 15 for controlling the trimming motor 15 which operates the control surfaces of the aircraft in a conventional manner through the force feel spring 17 and so that an automatic stabilization is achieved at all flight attitudes.

In a preferred embodiment, the power rating of the trimming motor 15 is selected to be sufficiently excessive to operate as an integrator for the purpose of making the trimming operation displacement proportional to the integrated trimming control signal $\delta_T$. In such an embodiment it is possible to obviate any displacement return at the trimming motor 15 since the displacement speed is only proportional to the applied voltage. In that instance, the trimming motor 15 operates as an integrator. A displacement proportional characteristic of the operation of the trimming motor 15 may also be achieved by supplying the control signal through respective networks to the trimming motor 15. Network 14 then operates as a comparator.

Although the invention has been described with reference to specific example embodiments, it will be appreciated, that it is intended to cover all modifications and equivalents within the scope of the appended claims.

What I claim is:

1. An apparatus for trimming and stabilizing an aircraft, comprising a trimming motor (15), manual steering control means including a control member (16) and trimming spring means (17) connected at one effective end to said trimming motor and the other efective end to said control member (16), transducer means (18) operatively connected across said trimming spring (17) of said manual steering control means for measuring a displacement of said trimming spring (17) relative to a neutral trimmed spring position, whereby said relative displacement is proportional to an expected rotational speed of said aircraft, said transducer means having a tap for providing a difference signal (R) representing said rotational speed proportional relative displacement of said trimming spring from said neutral trimmed position, low-pass filter means connected to said tap for producing a q-model signal from said difference signal, signal measuring means (19) for providing a measured signal representing the rotational speed of an aircraft about a given aircraft axis, signal comparing circuit means connected to receive said q-model signal and said measured signal for comparing said measured signal representing measured rotational speed with said q-model signal representing said expected rotational speed to produce a trimming control signal, and conductor means connecting an output of said signal comparing circuit means to said trimming motor (15) for automatically and directly trimming the control forces of an aircraft by said trimming motor for a fully automatic trimming operation during a flight maneuver and also providing the pilot with a simulate sensation of the steering control force.

2. The apparatus of claim 1, wherein said trimming motor (15) comprises a power rating which is overdimensioned sufficiently for the trimming motor to operate as an integrator whereby the displacement of the trimming motor is proportional to the integrated trimming control signal ($\delta_T$).

3. The apparatus of claim 2, further comprising first circuit means connected to receive said measured signal for producing a first attutude signal which is proportional to the attitude, second circuit means connected to receive an output signal from said signal comparing circuit means for producing a second attitude signal which is proportional to the attitude, third circuit means for producing a third attitude signal which is proportional to the pitching speed at which the aircraft changes its attitude, and fourth circuit means forming a signal summing circuit connected to receive said first, second, and third attitude signals, and means connecting said signal summing circuit to said trimming motor for directly integrating said three attitude signals in said trimming motor.

4. A method for trimming and stabilizing an aircraft, including manual steering control means having a control member, a trimming motor, and a trimming spring connected to said control member and to said trimming motor, comprising the following steps: producing a difference signal (R) representing a displacement of said trimming spring relative to a neutral trimmed position of said trimming spring, whereby said relative displacement is proportional to an expected rotational speed of said aircraft, passing said difference signal (R) through a low-pass filter for producing from said difference signal (R) a q-model signal representing a control characteristic of said aircraft regarding said expected rotational speed, measuring a horizon signal and differentiating said horizon signal for providing a measured signal representing the rotational speed of an aircraft about a given axis, comparing the q-model signal with the measuring signal to produce a trimming control signal, and controlling said trimming motor in response to said trimming control signal for automatically and directly trimming the control forces by said trimming motor for a fully automatic trimming operation during a flight maneuver while simultaneously providing the pilot with a simulated sensation of the steering control force.

5. The method of claim 4, further comprising dimensioning said trimming motor sufficiently excessively for said motor to operate as an integrator.

* * * * *

UNITED STATES PATENT AND TRADEMARK OFFICE
CERTIFICATE OF CORRECTION

PATENT NO. : 4,758,958

DATED : July 19, 1988

INVENTOR(S) : Michael von Gersdorff

It is certified that error appears in the above-identified patent and that said Letters Patent is hereby corrected as shown below:

Claim 1, column 5, line 55, replace "efective" by --effective--, column 6, line 15, replace "simulate" by --simulated--, Claim 3, column 6, line 25, replace "attutude" by --attitude--, Claim 4, column 6, line 56, replace "measuring" by --measured--.

Signed and Sealed this

Sixteenth Day of May, 1989

Attest:

DONALD J. QUIGG

Attesting Officer

Commissioner of Patents and Trademarks